US006193419B1

(12) United States Patent
Krude et al.

(10) Patent No.: US 6,193,419 B1
(45) Date of Patent: *Feb. 27, 2001

(54) WHEEL HUB/JOINT UNIT WITH INTERMEDIATE RING

(75) Inventors: Werner Krude, Neunkirchen-Seelscheid; Herbert Frielingsdorf, Lohmar, both of (DE)

(73) Assignee: GKN Automotive AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,503

(22) Filed: Dec. 28, 1998

Related U.S. Application Data

(63) Continuation-in-part of application No. 08/787,366, filed on Jan. 22, 1997, now Pat. No. 5,853,250.

(30) Foreign Application Priority Data

Jan. 24, 1996 (DE) .............................. 196 02 413

(51) Int. Cl.⁷ .............................. F16C 19/36; F16D 3/22
(52) U.S. Cl. ..................... 384/544; 464/178; 384/539
(58) Field of Search ................... 384/537, 539, 384/544, 504, 505, 506; 464/178, 182

(56) References Cited

U.S. PATENT DOCUMENTS 5,536,075  7/1996  Bertetti ........................ 301/105.1
5,853,250  12/1998  Krude et al. .................... 384/544

FOREIGN PATENT DOCUMENTS

| 3608346A1 | 9/1987 | (DE) . |
| 3618130A1 | 12/1987 | (DE) . |
| 3618139C2 | 12/1988 | (DE) . |
| 4023019A1 | 1/1992 | (DE) . |
| 4024534A1 | 2/1992 | (DE) . |
| 4300793A1 | 7/1993 | (DE) . |
| 4230639C1 | 10/1993 | (DE) . |
| 4436789A1 | 5/1995 | (DE) . |
| 0202968 | 11/1986 | (EP) . |
| 1340644 | 12/1973 | (GB) . |

OTHER PUBLICATIONS

Handbuch der Fertigungstechnik, Bankd 5, Fügen, Handhaben und Montieren, Herausgegeben von Prof. Dr.–Ing. Dr. h.c. Günter Spur, Mit 747 Bildern und 144 Tabellen, Carl Hanser Verlag München Wien, pp. 34–42, Dec. 1986.

*Primary Examiner*—Thomas R. Hannon

(57) ABSTRACT

A wheel hub/constant velocity joint unit having a double-row bearing assembly 18 arranged on the wheel hub 11 and comprising at least one separate inner bearing ring 42 pointing towards the constant velocity joint. The outer joint part 25 of the constant velocity joint comprises a central inner aperture 26 which points towards the wheel hub 11 and includes inner teeth 30. An annular member 36 with outer teeth 37 is non-rotatingly inserted into the inner aperture 26. Removable axial connecting means are provided between the outer joint part 25 and the annular member 36. The annular member 36 is non-removably connected to the wheel hub 11.

17 Claims, 10 Drawing Sheets

WHEEL HUB/JOINT UNIT WITH INTERMEDIATE RING

This application is a CIP of Ser. No. 08/787,366, Jan. 22, 1997 U.S. Pat. No. 5,853,250.

BACKGROUND OF THE INVENTION

The invention relates to a wheel hub/constant velocity joint unit having a double-row bearing assembly arranged on the wheel hub and comprising at least one separate inner bearing ring pointing towards the constant velocity joint. The invention also covers wheel hub/constant velocity joint units comprising two inner bearing rings separated from and slid on to the wheel hub. In both cases, the outer bearing ring is undivided, as usual, and inserted directly into a wheel carrier.

As known in the state of the art, it is necessary for the two symmetrically arranged rows of bearings of the bearing assembly designed as angular contact deep groove bearings to be fitted with a pretension to ensure that, in view of the cyclic loads acting on the wheel, the bearings are play-free.

DE 36 18 139 A1 describes a unit of the above-mentioned type wherein an annular member is connected to the wheel hub by friction welding. The friction weld provides the pretension of the separate inner bearing ring at the joint end relative to the wheel hub. The inner bearing ring is completely embedded in the material of the wheel hub. In this embodiment, there are problems in accurately setting the pretension, as the pretension builds up by the friction weld that still flows after the friction welding operation. The dimensions of the friction weld change during the cooling process. As a result, the remaining pretension at the bearing assembly still changes at the end of the friction welding operation.

A non-rotating, form-fitting connection between the annular member and the outer joint part is achieved by inter-engaging end teeth which are tensioned by a bolted connection between the wheel hub and the outer joint member. Even with slight axial settlement symptoms, the connection is no longer play-free and is not suitable for the present unit.

From DE 36 08 346 A1 it is known to connect the outer joint part of a unit of the above-mentioned type directly with the wheel hub by friction welding. A collar of the outer joint part, is positioned radially outside tie friction weld, providing axial support between the outer joint part and the separate inner bearing ring at the joint end. Again, there are problems accurately setting the pretension because during the cooling process following the friction welding operation the axial dimension still changes. The remaining pretension at the bearing assembly hence changes at the end of the friction welding operation. The degree of change first has to be determined empirically, with the degree of scatter for welding operations being greater than for purely mechanical production process or cold-forming operations.

There is a further disadvantage in that the friction welding operation referred to has to be carried out before the constant velocity joint is finally assembled. The assembly procedure for the constant velocity joint thus must use a complete unitary constant velocity joint, wheel hub and bearing. This requirement complicates the procedure.

EP 0 610 782 A1 describes a unit of the type wherein the separate inner bearing ring at the joint end is axially tensioned on the wheel hub by a formed sleeve member. The sleeve member is integrally formed or slides on separately. Subsequently, the outer joint part typically is directly connected to the wheel hub by inter-engaging teeth and a securing ring.

With this embodiment, each time the wheel hub or bearing design is changed, the design of the outer joint part has to be adapted accordingly. This means that the manufacturer has to produce a large number of joint embodiments.

It is the object of the invention to provide a unit of the initially mentioned type wherein the method of tensioning the bearing assembly and the joint assembly procedure are improved.

SUMMARY OF THE INVENTION

The objective is achieved by an outer joint part comprising a central inner aperture which points towards the wheel hub and inner teeth. An annular member is non-rotatingly inserted into the inner teeth, and produced separately from the wheel hub. The annular member includes outer teeth. The outer joint part and the annular member are connected by a removable axial connecting means. The annular member is connected to the wheel hub by a non-destructively non-removable connecting means. The non-removable connecting means provides the pretension for the bearing assembly. On the one hand, this embodiment allows the joint to be assembled with the outer joint part still separated from the wheel hub, i.e. it is possible to apply conventional assembly methods, either manual or automated, without making any changes or adaptations. On the other hand, it is possible to tension the bearing assembly by an annular member which is easy to handle. In addition, independent of the type of connecting means used between the annular member and the wheel hub, the bearing assembly can always be held under pretension while the connection is in the process of being produced. The material of the annular member is advantageously independent of the requirements to be met by the material of the outer joint part. For example, it is possible to take into account improved weldability or improved cold-formability, depending on the type of connecting means selected for the connection that cannot be unfastened.

The term "annular member" also refers to annular elements having an inner aperture with a radial supporting wall, so the element does not have a free axial passage.

As a result of the removable connecting means, it is possible to replace a damaged bearing or a damaged constant velocity joint. This is advantageous with respect to the cost of manufacturing. The non-removable connecting means ensures that the pretension of the bearing is maintained at a uniform level, even when the constant velocity joint is replaced.

Further, it is possible to vary either the bearing dimensions or the joint dimensions, without having to change the dimensions of the other part that is not affected. Any adaptation measure may refer entirely to modifying the annular member. This refers to the possibility of retaining certain joint sizes or designs while carrying out modifications in the region of the bearing assembly. For example, by designing the wheel carrier in different ways, it is also possible to use different joint sizes, while leaving the bearing assembly unchanged, in a vehicle model with different engine output variants.

The preferred connecting means between the inner teeth of the outer joint part and the outer teeth of the annular member consists of annular grooves associated with one another in the region of the teeth sets. A securing ring is inserted into the grooves for axial security. According to a preferred embodiment, the annular grooves and the securing ring comprise a rectangular cross-section. The securing ring engages the annular groove in the outer joint part under pretension and the annular groove in the annular member comprises radial play for fitting the ring. In this way, it is possible to produce a connection which is particularly suitable for accommodating the axial forces that occur. Modifications of the above are possible. For instance, it is possible to provide a double assembly of securing rings which engage the annular groove in one of the parts and rest against end contact faces of the respective other one of the parts.

Additional embodiments are possible for the connecting means between the annular member and the wheel hub. The connecting means at the same time ensures the pretension in the double-row bearing assembly. This characteristic makes it possible for the annular member to be separate from at least one separate inner bearing ring on the wheel hub, but also for the annular member integral with at least one separate inner bearing ring on the wheel hub.

In the case of both the above-mentioned embodiments it is possible to slide the annular member onto a centering collar at the wheel hub and for a weld to be formed in an axially extending longitudinal gap between the annular member and the centering collar.

A second possibility is that, at the wheel hub end, the annular member comprises an inner collar. A radially outwardly deformed outer collar at the joint end of the wheel hub axially and form-fittingly extends behind the inner collar.

A third possibility is that, at the hub end, the annular member comprises an attached sleeve which inserts into an inner aperture of the wheel hub. At its free end, the annular member comprises a beaded portion axially supported on a stop face of the wheel hub. Due to the longer length of the annular member it is particularly advantageous to provide a radial supporting wall inside its inner aperture which closes an axial passage and has a stiffening function.

According to a first embodiment it is proposed that the inner collar and the outer collar, at end faces contacting one another, form engaging means relative to one another. The collars are form-fitting in the direction of rotation, ensuring the transmission of torque between the annular member and the wheel hub. The form-fitting engaging means needs to be produced mechanically at the annular member only, prior to connecting the parts.

According to a second embodiment it is proposed that the annular member and the wheel hub, on circumferential faces contacting one another, form engaging means relative to one another which are form-fitting in the direction of rotation. This achieves the same effect as described above. According to a preferred embodiment, it is proposed to produce corresponding shaft teeth both at the annular member and at the wheel hub, prior to connecting the parts.

In both cases, at least one separate inner bearing ring may be integral with the annular member or separate from the annular member.

A further possibility based on the separate inner bearing ring and the annular member being separate from one another consists in the annular member being attached to the wheel hub by means of a friction weld. Radially outside the friction weld, there is an axially supporting contact between the annular member and the separate inner bearing ring.

BRIEF DESCRIPTION OF THE DRAWINGS

Preferred embodiments of the invention will be explained below with reference to the drawings wherein.

DETAILED DESCRIPTION OF THE PREFERRED EMBODIMENT

Figure 1:
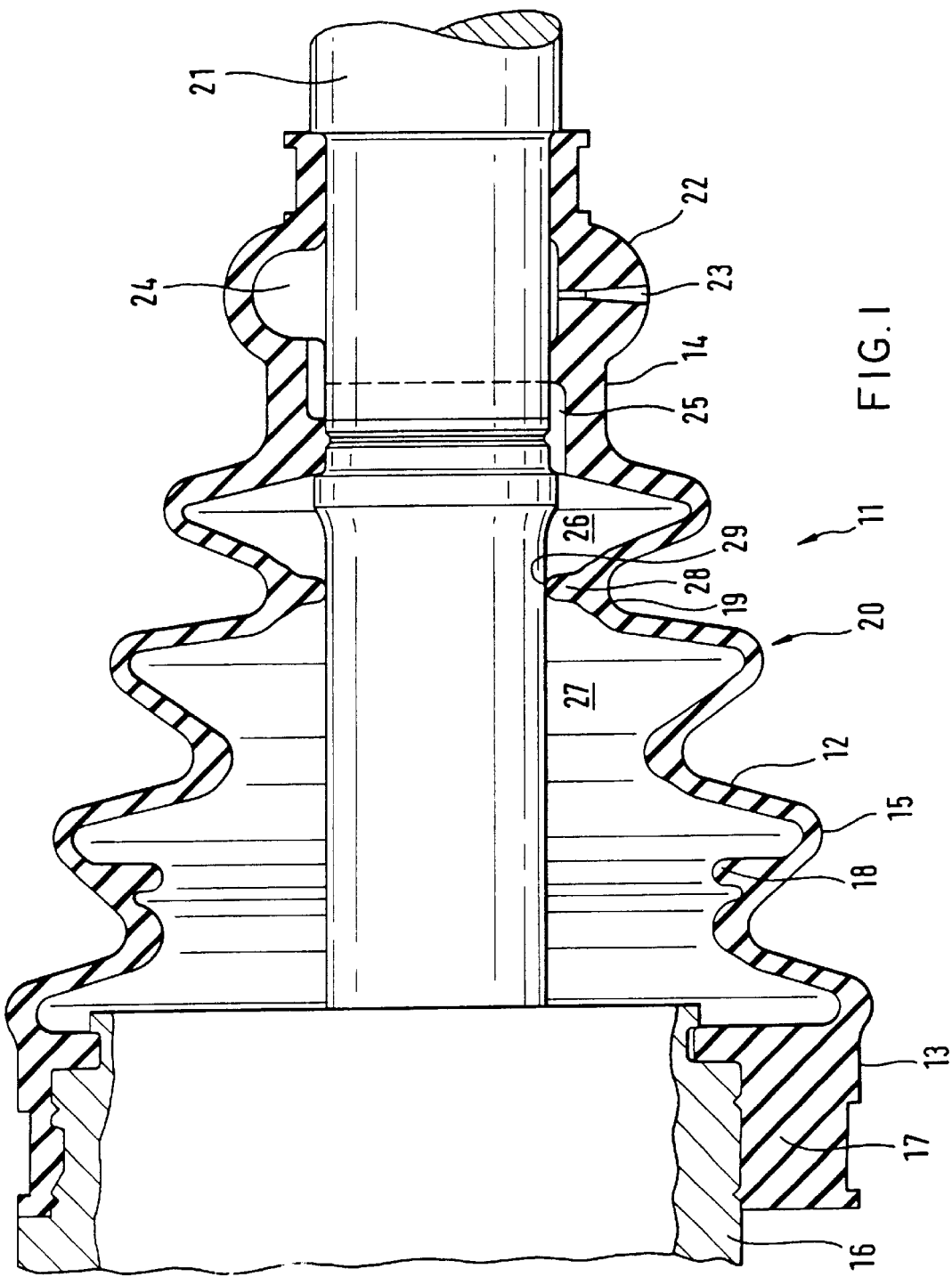
FIG. 1 is a wheel hub/constant velocity joint unit having an annular member which is separate from the inner bearing ring and connects to the wheel hub by a laser weld.

FIGS. 1 to 6 will be described below jointly with respect to any design details which are known in themselves and which are identical in all embodiments.

The Figures show a wheel hub 11, a constant velocity universal joint, generally indicated at 12, and an adjoining sideshaft 13 of a wheel hub/constant velocity joint unit for a steerable driving axle of a motor vehicle. The hub 11 has a flange 14 connected to a brake disc 15 by threaded bolts 16 integrally formed on the wheel hub 11. Bolts 17 are threaded into the flange 14 to secure a wheel rim (not illustrated) to the wheel hub 11.

Figure 2:
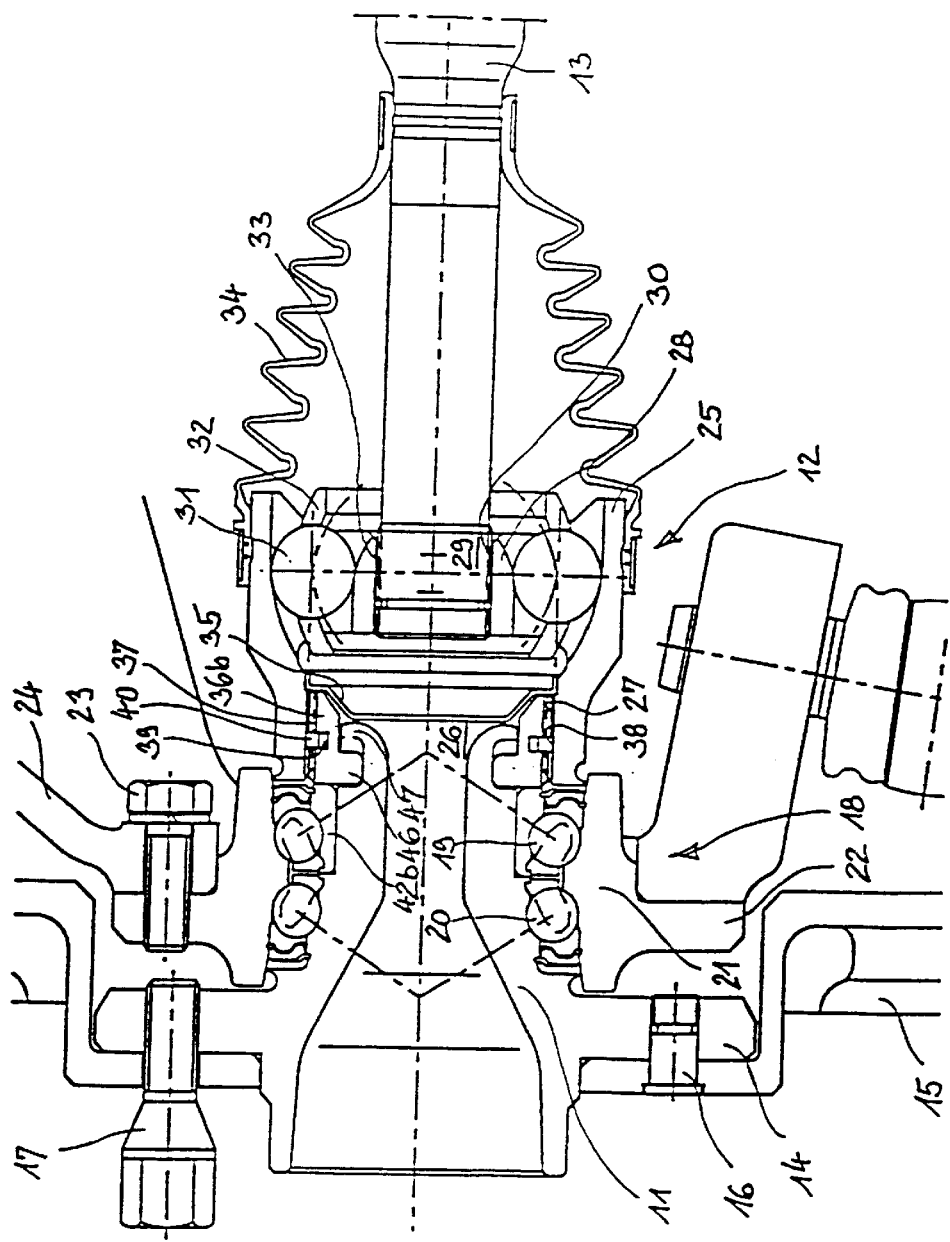
FIG. 2 is a wheel hub/constant velocity joint unit having an annular member which is separate from the inner bearing ring and form-fittingly connects to the wheel hub.
Figure 3:
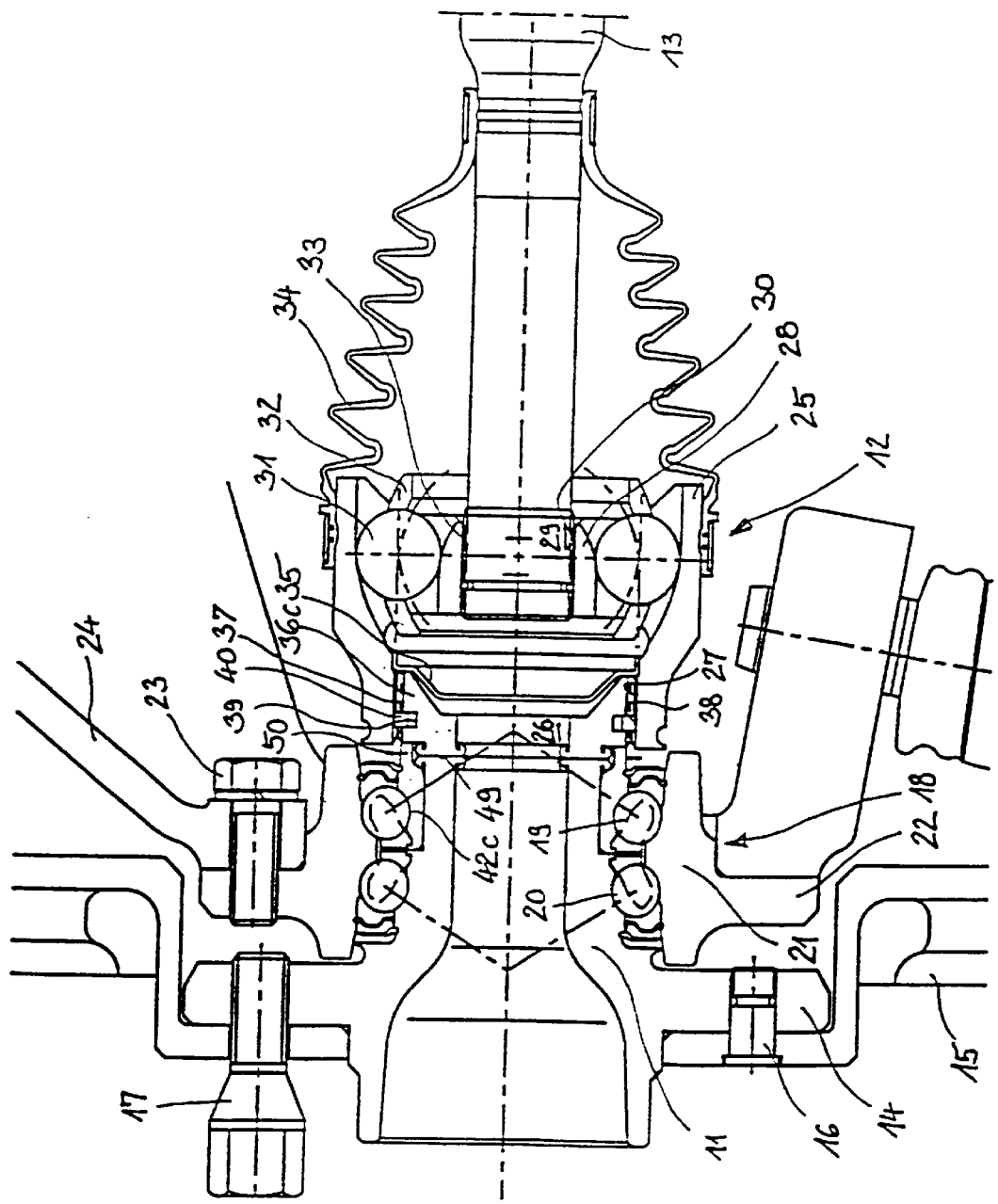
FIG. 3 is a wheel hub/constant velocity joint unit having an annular member which is separate from the inner bearing ring and connects to the wheel hub by a friction weld.
Figure 4:
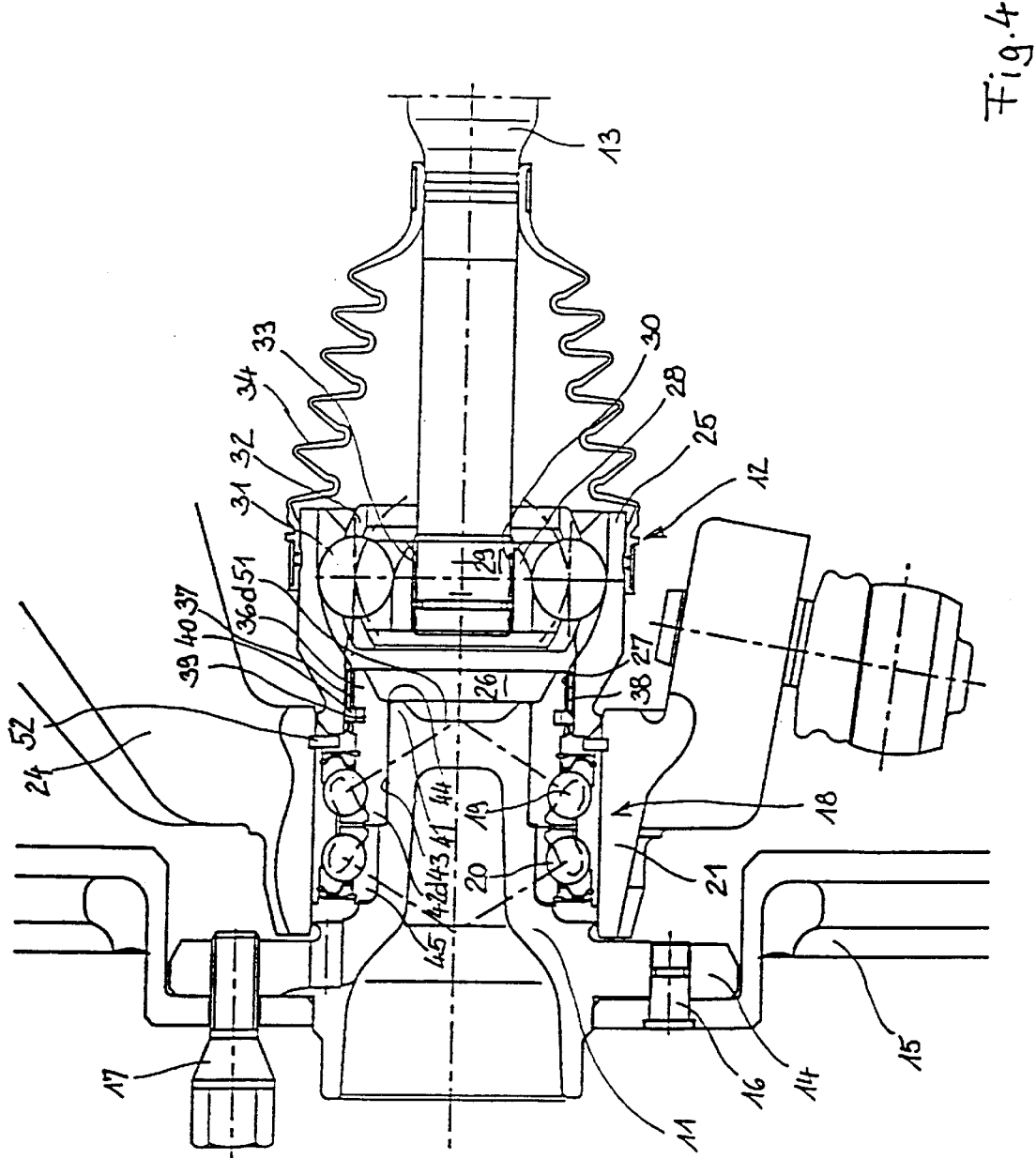
FIG. 4 is a wheel hub/constant velocity joint unit having an annular member which is integral with the separate inner bearing ring and which connects to the wheel hub by a laser weld.
Figure 5:
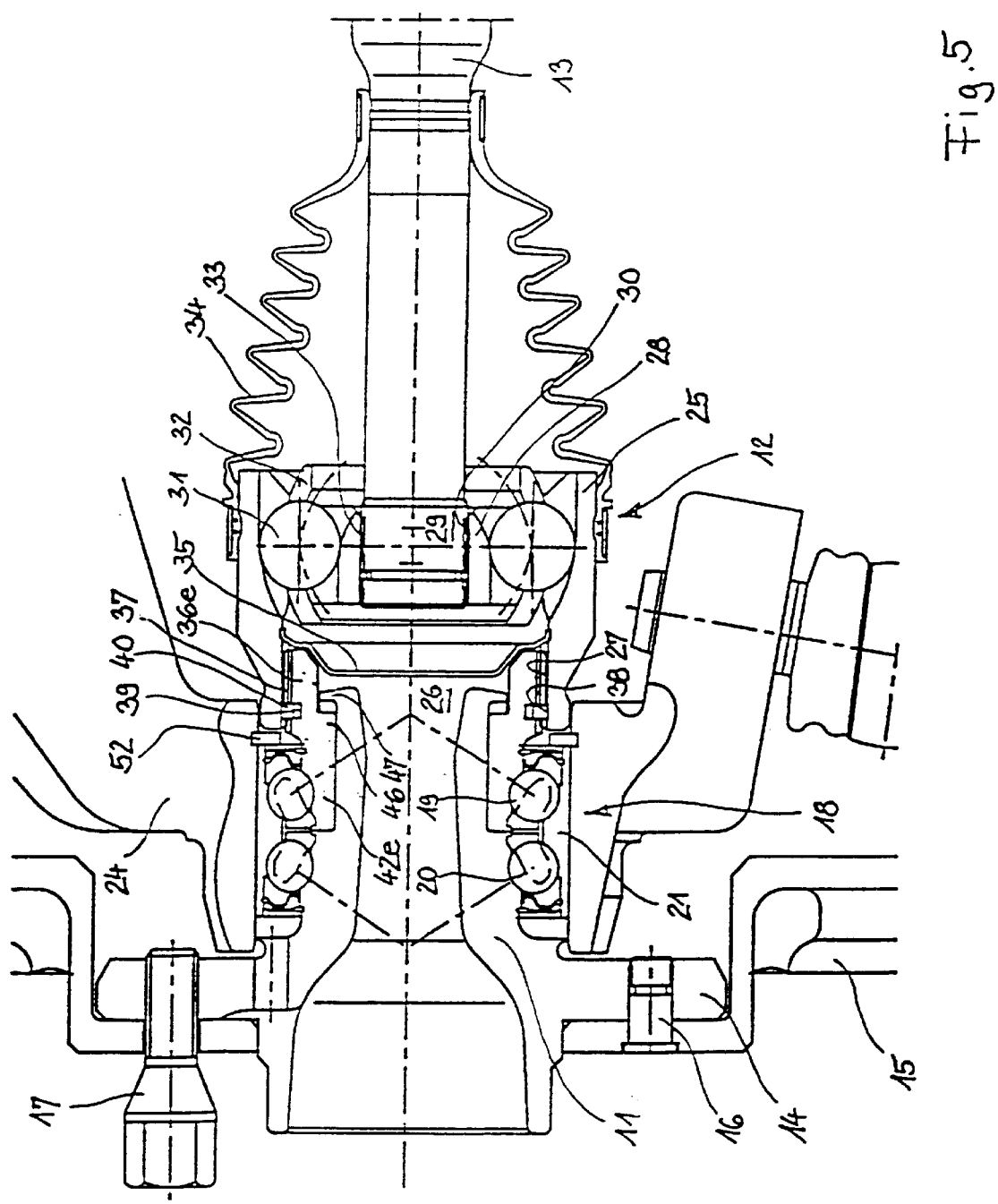
FIG. 5 is a wheel hub/constant velocity joint unit having an annular member which is integral with the separate inner bearing ring and which connects to the wheel hub through deformation of the latter.

A double-row bearing assembly, generally indicated at 18, comprising two rows of bearing balls 19, 20 is positioned on the wheel hub 11. The bearing balls 19, 20 run in an undivided outer bearing ring 21. In FIGS. 1 to 3, the outer bearing ring 21 comprises a flange-like expanded portion threaded to a wheel carrier 24 by bolts 23. In FIGS. 4 and 5, the outer bearing ring 21 inserts into an inner bore in the wheel carrier 24 by a press-fit and is axially secured by a securing ring 52. The operational lines of the two bearing rows are indicated by dash-dotted lines through the centers of the balls 19, 20.

The joint 12 comprises an outer joint part 25 whose inner aperture 26 at the wheel hub end comprises a set of inner teeth 27, and an inner joint part 28 having an inner aperture 29. The inner aperture 29 comprises a set of inner teeth 30. Further, the joint 12 is provided with torque transmitting balls 31 and a ball cage 32 for controlling the balls 31. A driveshaft 13 provided with outer teeth 33 is inserted into the inner aperture 29 of the inner joint part 28. The outer joint part 25 is sealed relative to the shaft 13 by a convoluted boot 34. In. the embodiments according to FIGS. 1, 2, 3 and 5, a plate metal cover 35 is inserted into the inner aperture 26 of the outer joint part 25. The cover 35 seals the joint relative to the wheel hub end. In the embodiment according to FIG. 4, a radial wall 51 in the wheel hub 11 fulfills this function.

Figure 1A:
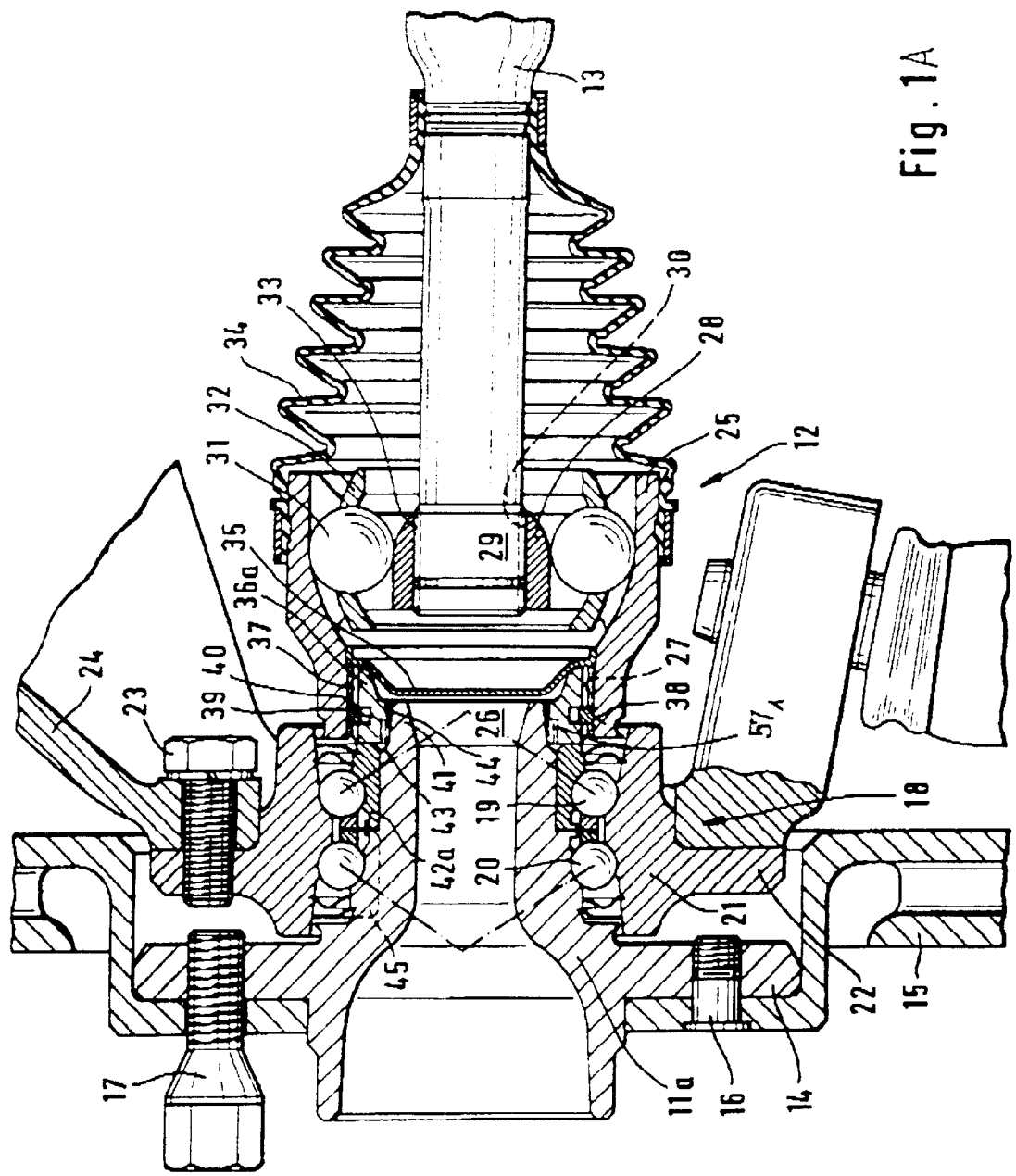
FIG. 1A shows an embodiment modified from the FIG. 1 unit.

In FIGS. 1 and 1A, an annular member 36a comprising a set of outer teeth 37 is inserted into the inner aperture 26. The teeth 27, 37 include annular grooves 38, 39 which correspond to one another and include a retaining ring 40 inserted into the grooves 38, 39 to axially secure the outer joint part 25 and the annular member 36a to each other. The teeth 27, 37 constitute a torque transmitting connection: The annular member 36a slides onto a centering collar 41 at the wheel hub 11 at a joint end. The end face, under pretension, rests against at least one separate inner bearing ring 42 on the wheel hub 11. The position of the annular member 36 relative to the wheel hub 11 is secured by a weld 44 produced in the annular gap 43 between the centering collar 41 and the annular member 36 by laser welding. In FIG. 1A the centering collar 41 is joined by splines $57_1$.

The upper half of the illustration according to FIGS. 1 and 1A, apart from the separate inner bearing ring 42, shows a second separate inner bearing ring 45. The end faces of both inner bearing rings contact one another and the second separate inner bearing ring 45 is directly axially supported on the wheel hub 11, as in the illustration according to FIG. 4. In the lower half of the illustrations, the second inner bearing ring is integral with the wheel hub 11, as in the embodiments according to FIGS. 2, 3, 5 and 6.

Figure 2A:
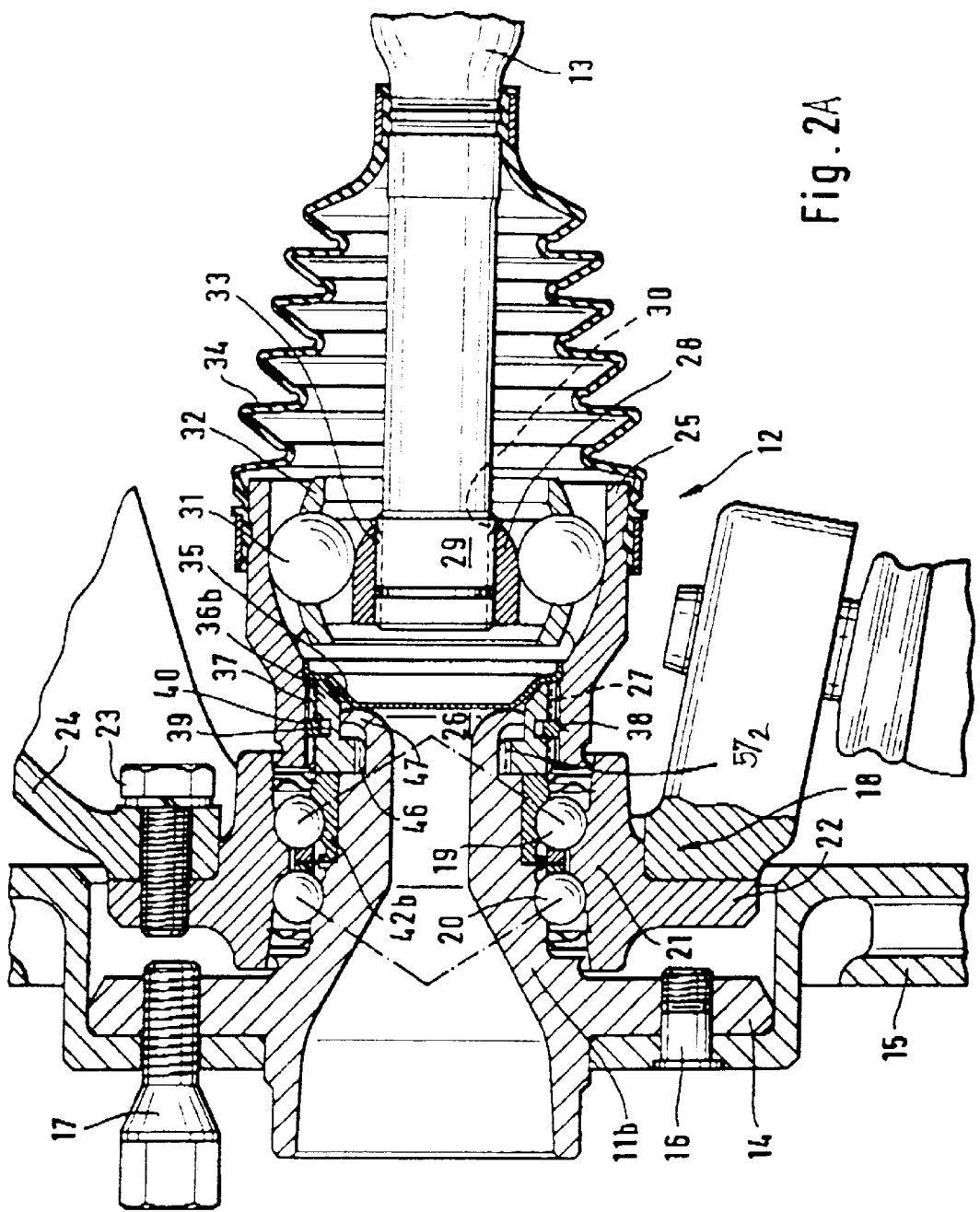
FIG. 2A shows an embodiment modified from the FIG. 2 unit.

FIGS. 2 and 2A show an annular member 36b connected to the outer joint part 25 by the same means and in the same way as described with reference to FIGS. 1 and 1A. At its end face, the annular member 36b is supported on the separate inner bearing ring 42 at the joint end, and tensions the inner bearing ring 42 relative to the wheel hub 11. The annular member 36b, has an inner collar 46 formed at the hub end with a radially outwardly deformed outer collar 47 at the wheel hub 11. The outer collar 46 engages behind the inner collar 46 which is pretensioned toward s the wheel end against the inner bearing ring 42. Before the annular member 36b slides on the outer collar 47, the annular member 36b is cylindrical on the outside, and has an outer diameter that corresponds permittably at most to the inner diameter of the inner collar 46. In FIG. 2A there are splines $57_2$ on the inner collar 46 and the outer collar 47.

FIG. 3 shows a separate annular member 36c axially and non-rotatingly connected to the outer joint part 25 by the same means and in the same way as described with reference to FIG. 1. The annular member 36c is connected to the wheel hub 11 in a material-locking way by a centric inner friction weld 49. At the separate inner bearing ring 42, an axial collar 50 is formed at the joint end. The axial collar 50 annularly surround s the outside of the friction weld 49. The axial collar 50 has an end face contacted by the annular member 36c. The separate inner bearing ring 42 is pretensioned relative to the wheel hub 11.

Figure 4A:
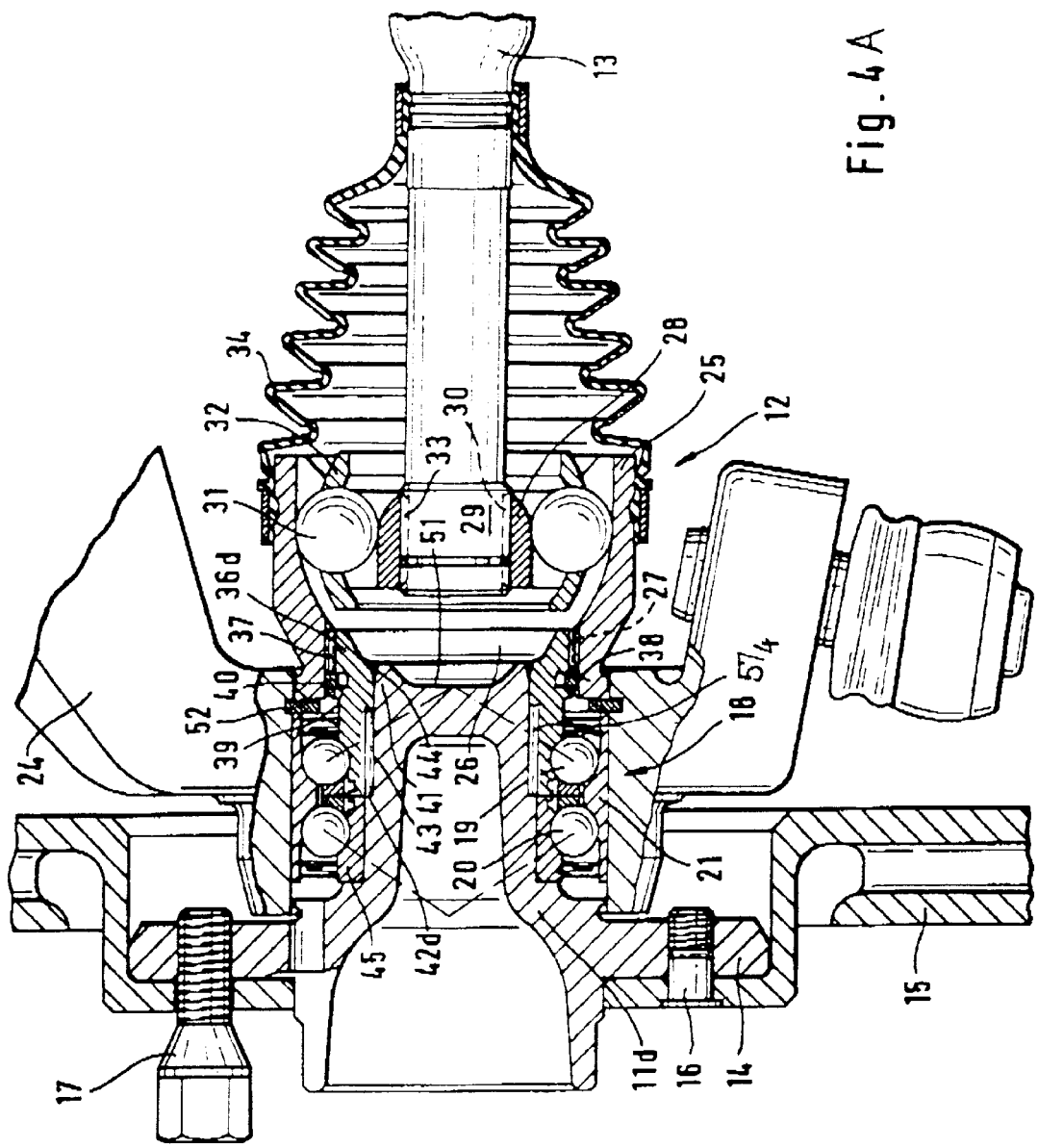
FIG. 4A shows an embodiment modified from the FIG. 4 unit.

In FIGS. 4 and 4A, the annular member 36d is connected to the outer joint member 25 in the same way and by the same means as described with reference to FIG. 1. In this embodiment, the annular member 36 is integral with the separate inner bearing ring 42d at the joint end. The annular member 36d slides onto a centering collar 41 supported by a radial wall 51. At the same time, the joint towards the hub end is sealed. In the annular gap 43 between the centering collar 41 and the annular member 36d there is a laser weld 44. As shown in FIG. 1 (top half), the annular member 36d is supported against a further separate inner bearing ring 45 on the wheel hub 11. In FIG. 4A the centering collar 41 is joined by splines $57_4$.

Figure 5A:
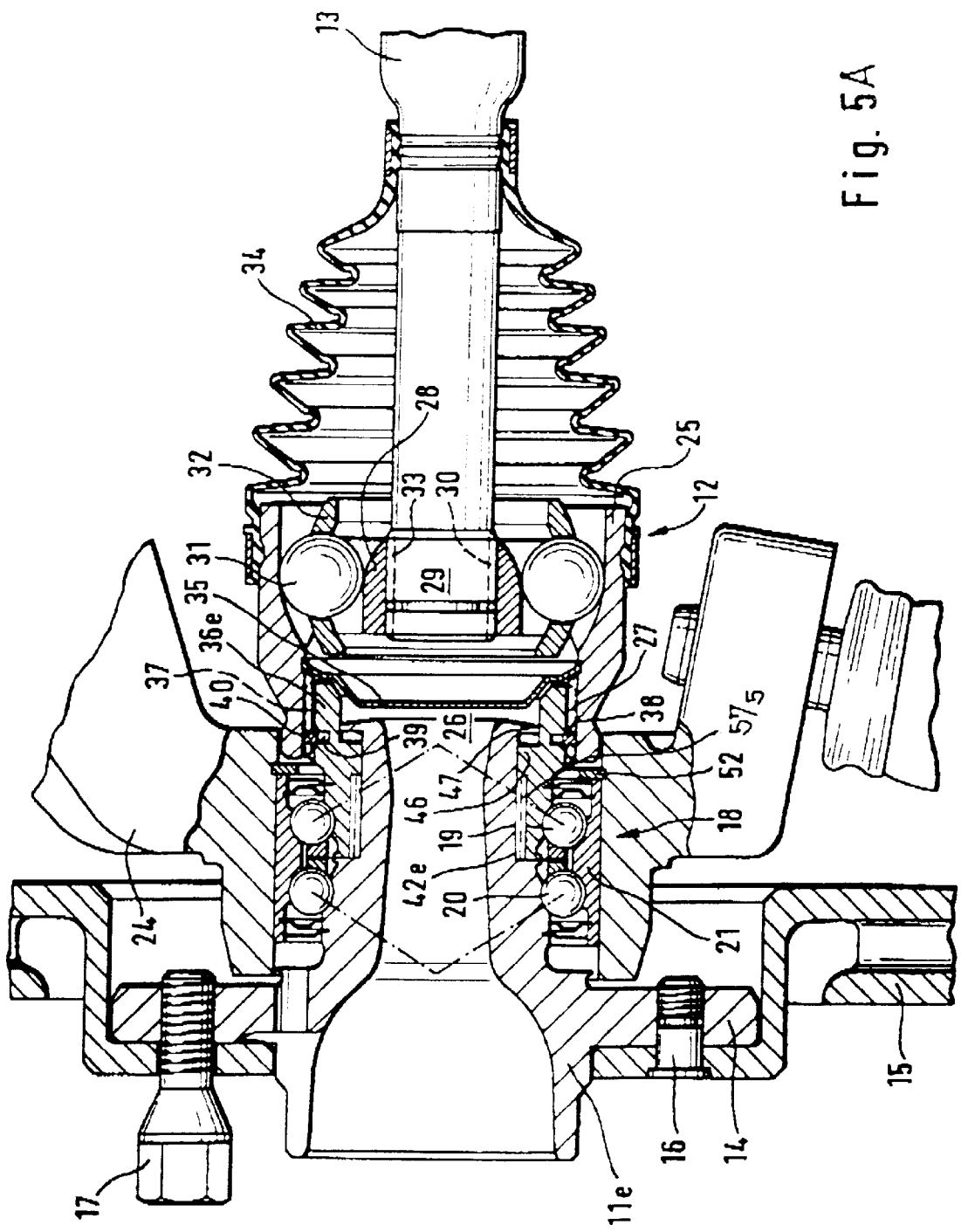
FIG. 5A shows an embodiment modified from the FIG. 5 unit.

In FIGS. 5 and 5A, the annular member 36e is secured to the outer joint part 25 by the same means and in the same way as described in FIG. 1. In this embodiment, the annular member 36 is integral with the inner bearing ring 42e at the joint end. A substantial part of the inner bearing ring 42e is in the form of an inner collar 46. The inner bearing ring 42e has a radially outwardly deformed outer collar 47 at the wheel hub 11 form-fittingly extending behind the inner collar 46 to axially pretension the same. Double lines indicate the connecting means which are form-fitting in the direction of rotation and which are at the contacting end faces of the two collars 46, 47. In FIG. 5A there are splines $57_5$ on the inner collar 46 and the outer collar 47.

Figure 6:
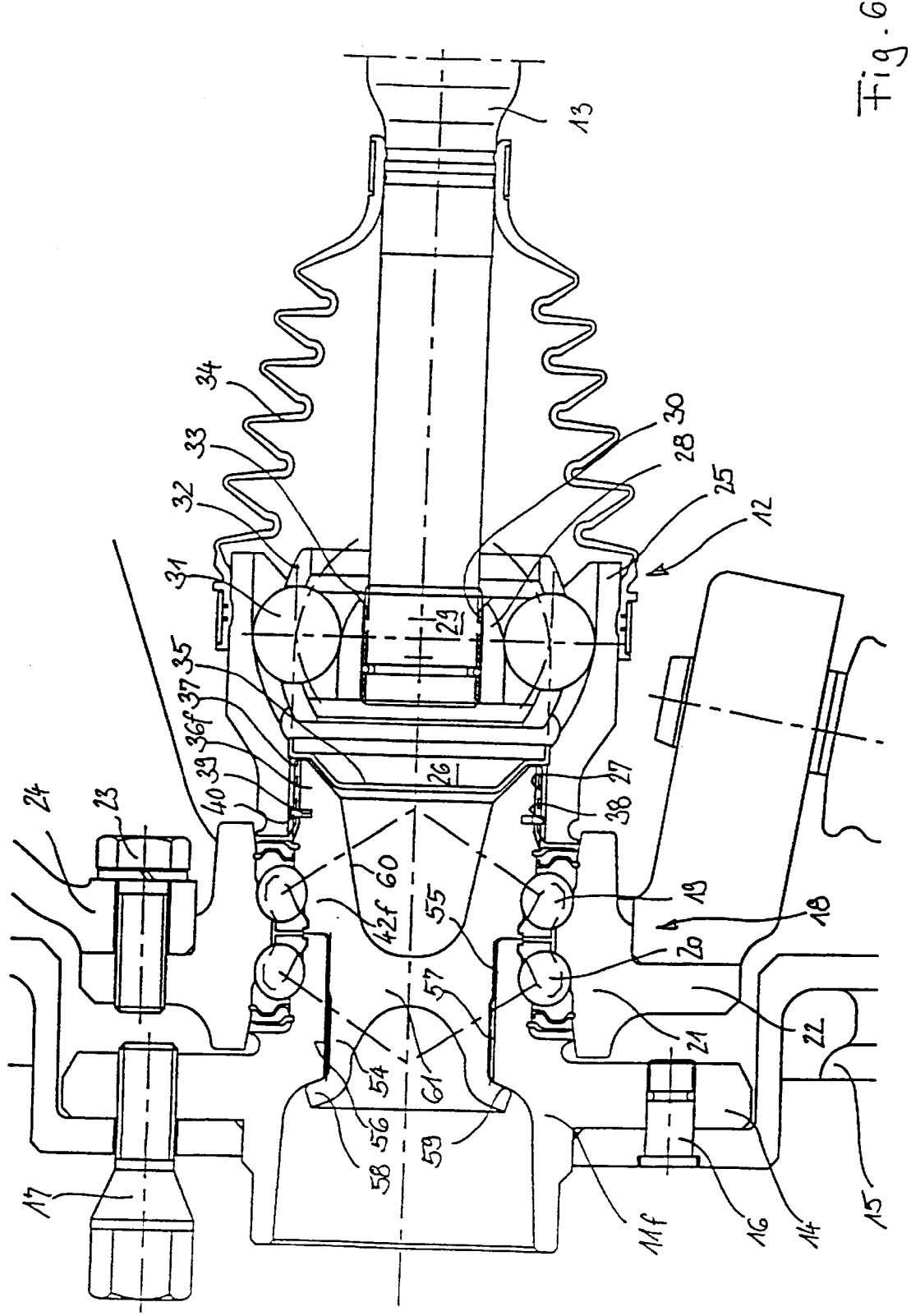
FIG. 6 is a wheel hub/constant velocity joint unit having an annular member which is integral with the separate inner bearing ring and which, by being deformed, connects to the wheel hub.

In FIG. 6, the annular member 36f is secured to the outer joint part 25 by the same means and in the same way as described in to FIG. 1. The annular member 36f is integral with the separate inner bearing ring 42f at the joint end. The annular member 36f, at the hub end, is adjacent to an attached sleeve 54 inserted into a through-aperture 55 of the wheel hub 11f. The through-aperture 55 includes inner teeth 57 which cooperates with shaft teeth 56 on the attached sleeve 54. The free end of the attached sleeve 54 is provided with a beaded portion 58 supported on and resting against an outer stop face 59 of the wheel hub 11f. Subsequently, the separate inner bearing ring 42f is axially tensioned relative to the outer bearing ring 21. The unit consisting of the annular member 11f, the separate inner bearing ring 42f and the attached sleeve 54, in its inner aperture 60, includes a radial supporting wall 61 which closes a free axial passage and has a stiffening function.

Preferred embodiments have been disclosed. A worker in this art would recognize that modifications would come within the scope of this invention. Thus, the following claims should be considered to determine the true scope of this invention.

What is claimed is:

1. A wheel hub/constant velocity joint unit having a double-row bearing assembly arranged on a wheel hub and comprising at least one separate inner bearing ring pointing towards a constant velocity joint wherein said outer joint part of said constant velocity joint comprises a central inner aperture which points towards said wheel hub and includes inner teeth, an annular member produced separately from said wheel hub and including outer teeth non-rotatingly inserted into said inner aperture, with removable axial connecting means provided between said outer joint part and said annular member, wherein said annular member is slid onto a centering collar at said wheel hub and said annular member being non-removably connected to said wheel hub.

2. A unit according to claim 1 wherein a weld in an axially extending annular gap between said annular member and said wheel hub forms unremovable connecting means.

3. A unit according to claim 2, wherein said annular member and said outer collar of said wheel hub, on end faces contacting one another, form engaging means relative to one another which are form-fitting in the direction of rotation.

4. A unit according to claim 2, wherein said annular member and said wheel hub, on circumferential faces contacting one another, form engaging means relative to one another which are form-fitting in the direction of rotation.

5. A unit according to claim 1 wherein a radially outwardly deformed outer collar at a joint end of said wheel hub axially form-fittingly extends behind said annular member.

6. A unit according to claim 5, wherein said annular member and said outer collar of said wheel hub (11), at end faces contacting one another, form engaging means relative to one another which are form-fitting in the direction of rotation.

7. A unit according to claim 5, wherein said annular member and said wheel hub, on circumferential faces contacting one another, form engaging means relative to one another which are form-fitting in the direction of rotation.

8. A unit according to claim 5, wherein said annular member comprises an inner collar at a hub end of said annular member and said outer collar form-fittingly extends behind said inner collar.

9. A unit according to claim 1 wherein said annular member comprises an attached sleeve at a hub end of said annular member, which attached sleeve is inserted into a through-aperture of said wheel hub and said attached sleeve comprising at a free end, which beaded portion is axially supported on a stop face of said wheel hub.

10. A unit according to claim 9, wherein said annular member and said wheel hub, on circumferential faces contacting one another, form engaging means relative to one another which are form-fitting in the direction of rotation.

11. A unit according to claim 1 wherein said annular member is attached to said wheel hub by means of a friction weld and that radially outside said friction weld, there exists a supporting contact is disposed between said annular member and said at least one separate inner bearing ring.

12. A unit according to claim 11, wherein said supporting contact is provided by a collar at said at least one separate inner bearing ring.

13. A unit according to claim 11, wherein said annular member has an inner aperture and is provided with a radial supporting wall which closes the axial passage of said inner aperture.

14. A wheel hub/constant velocity joint unit having a double-row bearing assembly arranged on a wheel hub and comprising at least one separate inner bearing ring pointing towards a constant velocity joint wherein said outer joint part of said constant velocity joint comprises a central inner aperture which points towards said wheel hub and includes inner teeth, an annular member produced separately from said wheel hub and including outer teeth non-rotatingly inserted into said inner aperture, with removable axial connecting means provided between said outer joint part and said annular member, and wherein a weld in an axially extending annular gap between said annular member and said wheel hub forms unremovable connecting means, and wherein said form engaging means are in the form of engaging splines means.

15. A wheel hub/constant velocity joint unit having a double-row bearing assembly arranged on a wheel hub and comprising at least one separate inner bearing ring pointing towards a constant velocity joint wherein said outer joint part of said constant velocity joint comprises a central inner aperture which points towards said wheel hub and includes inner teeth, an annular member produced separately from said wheel hub and including outer teeth non-rotatingly inserted into said inner aperture, with removable axial connecting means provided between said outer joint part and said annular member, and wherein said annular member is attached to said wheel hub by means of a friction weld and that radially outside said friction weld, there exists a supporting contact is disposed between said annular member and said at least one separate inner bearing ring, and wherein said form engaging means are in the form of engaging splines means.

16. A wheel hub/constant velocity joint unit having a double-row bearing assembly arranged on a wheel hub and comprising at least one separate inner bearing ring pointing towards a constant velocity joint wherein said outer joint part of said constant velocity joint comprises a central inner aperture which points towards said wheel hub and includes inner teeth, an annular member produced separately from said wheel hub and including outer teeth non-rotatingly inserted into said inner apertures with removable axial connecting means provided between said outer joint part and said annular member, and wherein said annular member comprises an attached sleeve at a hub end of said annular member, which attached sleeve is inserted into a through-aperture of said wheel hub and said attached sleeve comprising a beaded portion at a free end, which beaded portion is axially supported on a stop face of said wheel hub, and wherein said supporting contact is provided by a collar at said at least one separate inner bearing ring, and wherein said form engaging means are in the form of engaging splines means.

17. A wheel hub/constant velocity joint unit having a double-row bearing assembly arranged on a wheel hub and comprising at least one separate inner bearing ring pointing towards a constant velocity joint, wherein an outer joint part of said constant velocity joint comprises a central inner aperture which points towards said wheel hub and includes inner teeth, an annular member produced separately from said wheel hub and including outer teeth non-rotatingly inserted into said inner aperture, with removable axial connecting means provided between said outer joint part and said annular member, and said annular member being non-removably connected to said wheel hub, wherein a radially outwardly deformed outer collar at a joint end of said wheel hub axially form-fittingly extends behind said annular member, and wherein said annular member and said wheel hub, on circumferential faces contacting one another, form engaging splines relative to one another which are form fitting in the direction of rotation.

* * * * *